United States Patent
Arikawa et al.

(10) Patent No.: US 9,319,141 B2
(45) Date of Patent: Apr. 19, 2016

(54) OPTICAL TRANSMITTING/RECEIVING SYSTEM AND TIMING EXTRACTING METHOD IN OPTICAL TRANSMITTING/RECEIVING SYSTEM

(75) Inventors: Manabu Arikawa, Tokyo (JP); Emmanuel Le Taillandier De Gabory, Tokyo (JP); Kiyoshi Fukuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 602 days.

(21) Appl. No.: 13/639,829

(22) PCT Filed: Mar. 29, 2011

(86) PCT No.: PCT/JP2011/058492
§ 371 (c)(1),
(2), (4) Date: Oct. 5, 2012

(87) PCT Pub. No.: WO2011/125964
PCT Pub. Date: Oct. 13, 2011

(65) Prior Publication Data
US 2013/0022351 A1    Jan. 24, 2013

(30) Foreign Application Priority Data
Apr. 6, 2010    (JP) ................................ 2010-087446

(51) Int. Cl.
*H04B 10/00*    (2013.01)
*H04B 10/299*    (2013.01)
(Continued)

(52) U.S. Cl.
CPC ............ *H04B 10/299* (2013.01); *H04B 10/508* (2013.01); *H04B 10/61* (2013.01);
(Continued)

(58) Field of Classification Search
CPC .... H04B 10/299; H04B 10/508; H04B 10/61; H04B 10/611; H04B 10/0791; H04B 10/616; H04B 10/5162; H04B 10/672; H04B 10/69; H04L 7/027; H04L 7/007; H04L 7/0075; H04L 7/06

USPC .................. 398/155, 186, 188, 140, 25, 154, 398/202–204, 208
See application file for complete search history.

(56) References Cited

U.S. PATENT DOCUMENTS 7,450,288 B2 * 11/2008 Kikuchi ........................ 359/239
7,602,322 B2 * 10/2009 Tanimura et al. .............. 341/118
(Continued)

FOREIGN PATENT DOCUMENTS

JP    2004-530312 A    9/2004
JP    2008-205654 A    9/2008
(Continued)

OTHER PUBLICATIONS

Emmanuel et al.(DGD Tolerance Enhancement of Optical Polarization Demultiplexing by using Pseudo-Return-to-Zero Modulation Scheme © Sep. 2009 ).*

(Continued)

*Primary Examiner* — Hibret Woldekidan
(74) *Attorney, Agent, or Firm* — McGinn IP Law Group, PLLC

(57) ABSTRACT

An optical transmitting/receiving system using a timing extracting method that allows a feed forward type of optimized structure exhibits increased cost and increased power consumption, therefore, an optical transmitting/receiving system according to the present invention includes an optical transmitter apparatus including a light source, an optical modulator, and a pseudo RZ carver; and an optical receiver apparatus including a coherent receiver, an AD converter, a main signal processing unit, and a timing extracting unit; wherein the pseudo RZ carver forms a dip in an optical signal phase-modulated with a frequency f by the optical modulator by dropping the optical intensity at a symbol transition point to approximate zero per n-symbol interval; the AD converter outputs a sample obtained by AD converting an electrical signal which is detected and outputted by the coherent receiver; the timing extracting unit extracts a clock component of a frequency f/n from the sample and derives from the clock component a timing error signal which represents a deviation from optimum sampling timing; and the main signal processing unit adjusts a sampling timing on the basis of the timing error signal.

8 Claims, 12 Drawing Sheets

(51) Int. Cl.
- *H04B 10/61* (2013.01)
- *H04L 7/00* (2006.01)
- *H04B 10/508* (2013.01)
- H04L 7/06 (2006.01)
- H04L 7/027 (2006.01)

(52) U.S. Cl.
CPC .......... *H04B 10/611* (2013.01); *H04B 10/616* (2013.01); *H04L 7/007* (2013.01); *H04L 7/0075* (2013.01); H04L 7/027 (2013.01); H04L 7/06 (2013.01)

(56) References Cited

U.S. PATENT DOCUMENTS

| | | | |
|---|---|---|---|
| 7,646,985 B2* | 1/2010 | Arahira | 398/155 |
| 8,873,968 B2* | 10/2014 | Kikuchi | 398/147 |
| 8,971,723 B2* | 3/2015 | Le Taillandier De Gabory et al. | 398/182 |
| 2002/0040980 A1 | 4/2002 | Dave et al. | |
| 2003/0067651 A1* | 4/2003 | Wan et al. | 359/133 |
| 2006/0291870 A1* | 12/2006 | Wan et al. | 398/183 |
| 2008/0080870 A1* | 4/2008 | Tsuji | 398/155 |
| 2008/0272943 A1* | 11/2008 | Tanimura et al. | 341/131 |
| 2009/0129789 A1* | 5/2009 | Hanawa | 398/214 |
| 2009/0257757 A1* | 10/2009 | Wan et al. | 398/202 |
| 2010/0254716 A1* | 10/2010 | Akiyama et al. | 398/188 |
| 2012/0281981 A1* | 11/2012 | Le Taillandier De Gabory et al. | 398/29 |

FOREIGN PATENT DOCUMENTS

| | | |
|---|---|---|
| JP | 4303760 B2 | 7/2009 |
| WO | WO 2007/004338 A1 | 1/2007 |

OTHER PUBLICATIONS

International Search Report (ISR) (PCT Form PCT/ISA/210) dated May 10, 2011, in PCT/JP2011/058492.

E. de Gabory, et al., "DGD Tolerance Enhancement of Optical Polarization Demultiplexing by using Pseudo-Return-to-Zero Modulation Scheme", Proceedings of the 2009 IEICE Society Conference, Institute of Electronics, Information, and Communication Engineers, Sep. 15, 2009, B-10-85, p. 265.

Oerder, et al., "Digital Filter and Square Timing Recovery", IEEE Transactions on Communications, vol. 36, No. 5, May 1988, pp. 605-612.

Gardner, "A BPSK/QPSK Timing-Error Detector for Sampled Receivers", IEEE Transactions on Communications, vol. Com-34, No. 5, May 1986, pp. 423-429.

* cited by examiner (RELATED ART)

OPTICAL TRANSMITTING/RECEIVING SYSTEM AND TIMING EXTRACTING METHOD IN OPTICAL TRANSMITTING/RECEIVING SYSTEM

TECHNICAL FIELD

The present invention relates to optical transmitting/receiving systems and timing extracting methods in optical transmitting/receiving systems, in particular, to an optical transmitting/receiving systems and a timing extracting method in an optical transmitting/receiving system which are used in digital coherent optical communication where the sampling frequency is limited.

BACKGROUND ART

In digital communication systems, it is important to obtain optimum signals by performing Analog-Digital (AD) conversion on received continuous signals at the right time. That is particularly important in order to ensure channel capacity if the sampling frequency of AD conversion is limited.

On the other hand, instead of controlling the timing of AD conversion, it is also possible in digital communication systems to obtain signals at effectively optimum sampling timing by applying digital signal processing such as the interpolation process to samples obtained by asynchronous sampling AD conversion. Such timing optimization in entire digital domains has advantages with respect to downsizing and cost reduction of a receiving apparatus because it becomes unnecessary to equip a control apparatus used for timing control of AD conversion. In order to optimize the timing by means of the digital signal processing of interpolation, it is desirable that the absolute amount of a deviation from an optimum sampling timing in the AD converted signal has been obtained. An example of a timing extracting method, which is the method for deriving such an error between a sampling timing of AD conversion and an ideal timing from a signal obtained by AD conversion, is described in the non patent literature 1.

In the method described in the non patent literature 1, an error in sampling timing is detected by the phase of a clock component whose frequency is equal to the baud rate included in signal intensity. FIG. 16 is a block diagram of a timing error detection apparatus 600 to illustrate the related timing extracting method described in the non patent literature 1. The timing error detection apparatus 600 is provided with an AD converter 610 and a timing extracting unit 620. Here, an input signal is assumed to be a signal received by coherent optical reception after being mixed with local oscillating light.

The received signal is AD converted by the AD converter 610. The AD converter 610 performs samplings four times per symbol of the input signal, that is, it performs quadruple oversampling.

The timing extracting unit 620 is provided with an intensity detection unit 621, a frequency filter unit 622, and a phase detection unit 623. The intensity detection unit 621 receives the signal from the AD converter 610 and detects its intensity by squaring the signal. Next, the frequency filter unit 622 extracts only a frequency component corresponding to the clock frequency from the acquired input signal intensity. Finally, the phase detection unit 623 detects the phase of the extracted clock frequency component and outputs the phase as a timing error signal.

According to the timing extracting method described in the non patent literature 1 as mentioned above, a deviation of sampling timing for an input signal from the optimum sampling timing can be acquired as a measured value directly. Accordingly, it becomes possible to adopt not only a configuration in which timing is optimized by feeding back a timing error signal to an AD converter but also a feed-forward type of optimized configuration in which timing is optimized by digital signal processing at a subsequent stage. Furthermore, the method has an outstanding feature that the timing error signal is not affected by the phase or frequency of a local oscillating light in the coherent optical reception because of utilizing the intensity of an input signal.

On the other hand, an example of another timing extracting method, which is the method for operating with sampling two times per symbol without quadruple oversampling, is described in the non patent literature 2 and the patent literature 1.

The non patent literature 2 discloses a method for calculating a timing error signal for a BPSK (Binary Phase Shift Keying) signal and a QPSK (Quadrature Phase Shift Keying) signal, both of which are generally used in the coherent communication system. However, the timing extracting method described in the non patent literature 2 has a problem that communication quality cannot be secured due to degradation of the performance if the difference in the frequency is large between an optical carrier of a transmission signal and a local oscillating light used at the receiving side.

In contrast, a timing extracting method described in the patent literature 1 is operable even if the difference in the frequency is large between an optical carrier of a transmission signal and a local oscillating light used at the receiving side. However, the sampling timing achieved by feedback control does not become an optimum sampling timing for data decision. Therefore, signal degradation arises, or complication of processing is caused to compensate it.

Furthermore, from the timing error signal obtained by the timing extracting method described in the non patent literature 2 and the patent literature 1, a value of a deviation in timing cannot be directly derived, and only a value which is proportional to the deviation in timing but dependent on signal intensity can be obtained. Accordingly, these methods are not suitable for a feed forward type configuration for timing optimization as the timing extracting method described in non patent literature 1, and a certain amount of time is required for synchronization.

As mentioned above, adopting the timing extracting methods described in the non patent literature 2 and the patent literature 1 to an optical transmitting/receiving method or an optical transmitting/receiving system involves problems.

Patent Literature 1: Japanese patent No. 4303760 (paragraphs [0100]-[0126])

Non Patent Literature 1: M. Oerder and H. Meyr, "Digital Filter and Square Timing Recovery," IEEE Transactions on Communications Vol. 36, No. 5 1988, pp. 605-612.

Non Patent Literature 2: F. M. Gardner, "A BPSK/QPSK Timing-Error Detector for Sampled Receivers," IEEE Transactions on Communications Vol. Com-34, No. 5 1986, pp. 423-429.

Non Patent Literature 3: E. de Gabory et al., "DGD Tolerance Enhancement of Optical Polarization Demultiplexing by using Pseudo-Return-to-Zero Modulation Scheme," Proceedings of the 2009 IEICE Society Conference, The Institute of Electronics, Information and Communication Engineers, Sep. 15, 2009, B-10-85, p. 265.

DISCLOSURE OF INVENTION

Problem to be Solved by the Invention

It becomes possible that a feed forward type of optimized configuration is adopted in the timing extracting method described in the non patent literature 1 as mentioned above. However, due to extracting the phase of a clock frequency component from a digitized signal, it is necessary to use a quadruple oversampling in order to extract the phase correctly. This reason is as follows: the bandwidth of an input signal is usually comparable with the clock frequency, and accordingly, in order to extract the phase correctly from a certain frequency component after squaring the signal, a sampling frequency which is at least four times as high as the clock frequency is necessary according to the sampling theorem. However, the cost of an AD converter with high sampling frequency is high. And, the higher the sampling frequency becomes, the more the power consumption becomes. Accordingly, in the related timing error detection apparatus using the timing extracting method described in the non patent literature 1 and the optical transmitting/receiving system using the same, there is a problem that the cost increases and the power consumption increases.

The objective of the present invention is to provide an optical transmitting/receiving system and a timing extracting method in an optical transmitting/receiving system which solve the problem mentioned above that an optical transmitting/receiving system using a timing extracting method that allows a feed forward type of optimized structure exhibits increased cost and increased power consumption.

Means for Solving a Problem

An optical transmitting/receiving system according to an exemplary aspect of the invention includes an optical transmitter apparatus including a light source, an optical modulator, and a pseudo RZ carver; and an optical receiver apparatus including a coherent receiver, an AD converter, a main signal processing unit, and a timing extracting unit; wherein the pseudo RZ carver forms a dip in an optical signal phase-modulated with a frequency f by the optical modulator by dropping the optical intensity at a symbol transition point to approximate zero per n-symbol interval; the AD converter outputs a sample obtained by AD converting an electrical signal which is detected and outputted by the coherent receiver; the timing extracting unit extracts a clock component of a frequency f/n from the sample and derives from the clock component a timing error signal which represents a deviation from optimum sampling timing; and the main signal processing unit adjusts a sampling timing on the basis of the timing error signal.

A timing extracting method in an optical transmitting/receiving system according to an exemplary aspect of the invention includes the steps of: transmitting an optical signal with a clock component whose frequency is lower than a clock frequency used for data modulation; receiving the optical signal; and deriving a timing error signal from the clock component.

A timing extracting method in an optical transmitting/receiving system according to an exemplary aspect of the invention includes the steps of: forming a dip in an optical signal phase-modulated with a frequency f by dropping the optical intensity at a symbol transition point to approximate zero per n-symbol interval; AD converting an electrical signal obtained by detecting the optical signal in which the dip is formed; extracting a clock component of a frequency f/n from the AD-converted sample; deriving from the clock component a timing error signal which represents a deviation from optimum sampling timing; and adjusting a sampling timing on the basis of the timing error signal.

Effect of the Invention

According to the optical transmitting/receiving system by the present invention, it is possible to suppress an increase in the cost and an increase in the power consumption even in the case of using a timing extracting method enabling a feed forward type of optimized configuration.

DESCRIPTION OF EMBODIMENTS

The exemplary embodiments of the present invention will be described with reference to drawings below.

The First Exemplary Embodiment

Figure 1:
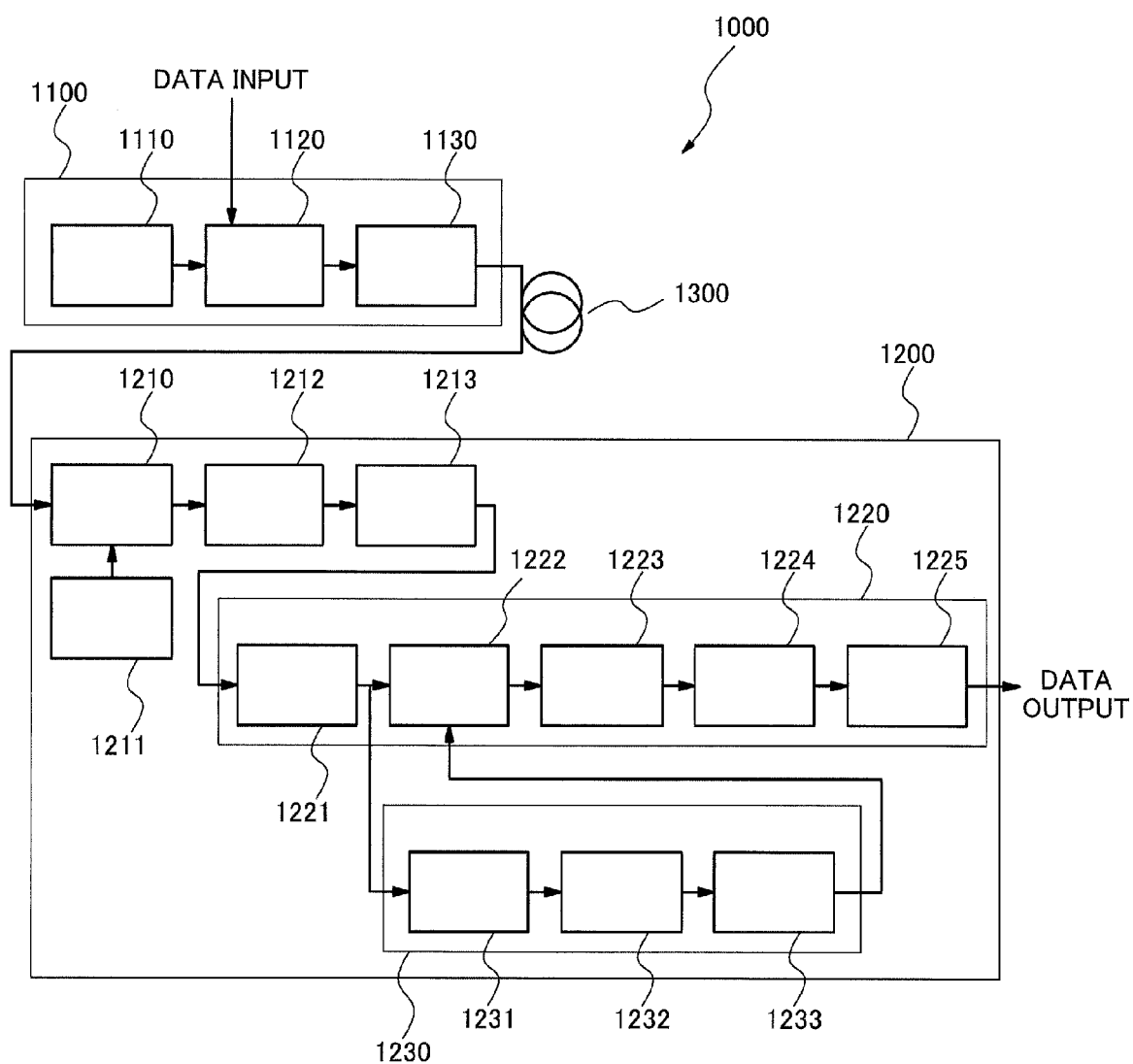
FIG. 1 is a block diagram showing a configuration of an optical transmitting/receiving system in accordance with the first exemplary embodiment of the present invention.

FIG. 1 is a block diagram showing a configuration of an optical transmitting/receiving system 1000 in accordance with the first exemplary embodiment of the present invention. The optical transmitting/receiving system 1000 includes an optical transmitter apparatus 1100 and an optical receiver apparatus 1200. An optical signal transmitted from the optical transmitter apparatus 1100 is received by the optical receiver apparatus 1200 through a transmission line 1300. In the optical receiver apparatus 1200, after performing coherent detection of the received optical signal, a timing is extracted from Analog-to-Digital (AD) converted samples.

The optical transmitter apparatus 1100 includes a light source 1110, an optical modulator 1120, and a pseudo RZ carver 1130. An optical carrier generated in the light source 1110 is sent to the optical modulator 1120, where it is modulated by data to be transmitted. In the following description, DP-QPSK (Dual Polarization-Quadrature Phase Shift Keying) modulation method will be used as an example of a modulation method. However, the modulation method is not limited to it, and other modulation methods such as BPSK (Binary Phase Shift Keying) modulation method may be used. In the case of DP-QPSK modulation method, an in-phase (I) component and a quadrature (Q) component in each of X and Y polarizations are modulated with a clock frequency f. The clock frequency is equal to the baud rate of the modulation signal, and particularly in the case of DP-QPSK modulation method, the bit rate of transmission is four times as high as the baud rate. The optical signal modulated by the optical modulator 1120 is sent to the pseudo RZ carver 1130.

The pseudo RZ carver 1130 performs the process for modulating the intensity of the output light from the optical modulator 1120 and modulating the output light into a pseudo RZ (Return to Zero) signal. Concretely speaking, it performs the process for carving a dip in the inputted optical signal by dropping the intensity at a symbol transition point to zero "0" per n-symbol interval.

Figure 2:
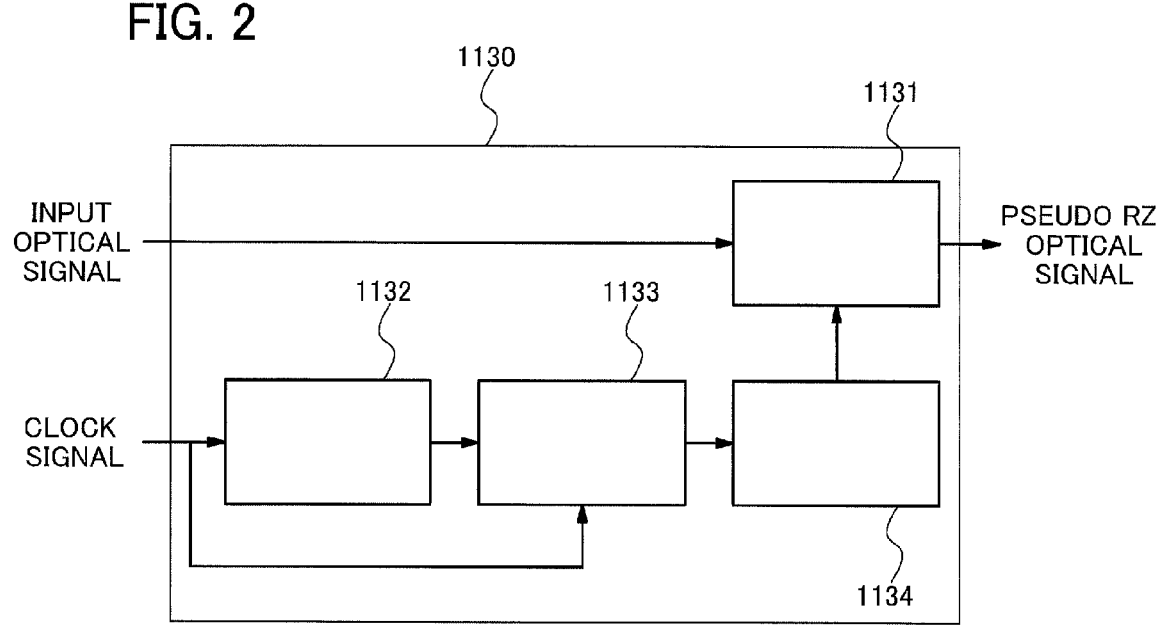
FIG. 2 is a block diagram showing a configuration of a pseudo RZ carver in accordance with the first exemplary embodiment of the present invention.

As an example of the pseudo RZ carver 1130, the configuration of the pseudo RZ carver 1130 disclosed in non patent literature 3 is shown in FIG. 2. The pseudo RZ carver 1130 is provided with a PSK modulator 1131, a frequency divider 1132, a D flip-flop (DFF) 1133, and a driver 1134. An optical signal and a clock signal are inputted into the pseudo RZ carver 1130, the optical signal being modulated by the optical modulator 1120, the clock signal having the same frequency as that of, and phase-locked with, the clock signal used in the optical modulator 1120. The pseudo RZ carver 1130 divides this clock signal by a factor of 2n in the frequency divider 1132, and thereby generates a divided clock signal of a frequency f/(2n).

The divided clock signal of the frequency f/(2n) obtained in the frequency divider 1132 is inputted into the D flip-flop 1133, and the output of the D flip-flop 1133 is converted into an appropriate voltage level by the driver 1134. The PSK modulator 1131 is driven by the output voltage of the driver 1134.

Figure 3:
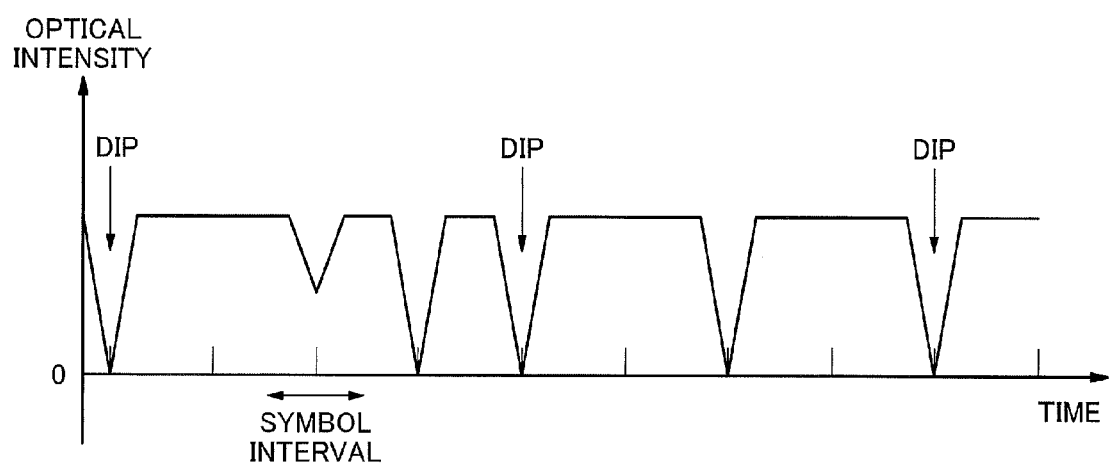
FIG. 3 is a waveform chart showing schematically an optical waveform generated by a pseudo RZ signal transmitted from an optical transmitter apparatus in accordance with the first exemplary embodiment of the present invention.

The PSK modulator 1131 driven by the divided clock of f/(2n) operates so as to switch a phase of the inputted optical signal from 0 degree to 180 degree per n-symbol interval, and forms an intensity dip by dropping the light intensity at a symbol transition point to zero "0" per n-symbol interval. In this way, the pseudo RZ carver 1130 outputs a pseudo RZ optical signal. FIG. 3 schematically shows an example of an optical waveform of a pseudo RZ(4)-QPSK signal where the light intensity at a symbol transition point is set to zero "0" every four symbol intervals.

The generated pseudo RZ signal has clock components of a frequency f/n and its harmonics in addition to a clock component of the frequency f included in the original input optical signal. When the pseudo RZ carver 1130 gives the clock component of the frequency f/n to the input optical signal, it utilizes only a shorter period of time centered at a symbol transition point than the symbol interval. That is to say, since the signal at the optimum time for symbol decision is not affected, no sensitivity degradation due to adding the clock component of the frequency f/n arises in principle.

The optical signal transmitted from the optical transmitter apparatus 1100, passing through the transmission line 1300, is received by the optical receiver apparatus 1200. The optical receiver apparatus 1200 includes a coherent receiver 1210, a local oscillating light source 1211, a filter 1212, an AD converter 1213, a main signal processing unit 1220, and a timing extracting unit 1230.

The coherent receiver 1210 detects the received optical signal by mixing it with the local oscillating light from the local oscillating light source 1211. Electrical signals having information about I component and Q component in each of X polarization and Y polarization are outputted from the coherent receiver 1210, after passing through an appropriate filter 1212, they are AD converted by the AD converter 1213. At that time, the sampling frequency of the AD converter 1213 can be set for a value which is about two times as high as the clock frequency. The filter 1212 is used under the condition that no aliasing arises in the AD conversion. Since the sampling frequency in the AD conversion is two times as high as the clock frequency, the Nyquist frequency becomes equal to the clock frequency.

The timing extracting unit 1230 calculates the intensity by squaring the received signal, and extracts a frequency component corresponding to the clock component of the frequency f/n, which is added at the transmission side, by filtering only an intended frequency. And then the timing extracting unit 1230 extracts a timing error from the phase of this clock component of the frequency f/n. Here, for example, in the case that a clock component of a frequency f/4 is added at the transmission side, if the bandwidth of the squared signals is smaller than 7f/4, no aliasing component is superposed on the clock component of the frequency f/4. Therefore, a low pass filter whose passband width is smaller than 7f/8 can be used as the filter 1212, for example.

The AD converted signal is inputted into the main signal processing unit 1220. The main signal processing unit 1220 applies digital signal processing to the AD converted signal and outputs the received data. Here, it is possible that the digital signal processing includes signal processing such as dispersion compensation, interpolation, polarization demultiplexing, carrier phase compensation, and data decision, for example. In FIG. 1, an example of the configuration of the main signal processing unit 1220 is shown which is provided with a dispersion compensation unit 1221, an interpolation unit 1222, a polarization demultiplexing unit 1223, a carrier phase compensation unit 1224, and a data decision unit 1225. However, the configuration of the main signal processing unit 1220 in FIG. 1 is just an example and digital signal processing can be also performed by another configuration.

A signal which digital signal processing is applied to by the main signal processing unit 1220, for example, a signal which dispersion compensation is applied to by the dispersion compensation unit 1221 is inputted into the timing extracting unit 1230. The timing extracting unit 1230 calculates a timing error signal to optimize sampling timing of AD conversion. In this process, according to the present exemplary embodiment, a deviation of sampling timing from an ideal value can be derived directly by calculation.

The timing extracting unit 1230 is provided with an intensity detection unit 1231, a frequency filter unit 1232, and a phase detection unit 1233. The intensity detection unit 1231 calculates the intensity by calculating a sum of squares of I component and Q component in each of X polarization and Y polarization. The intensity can be calculated by using not only a sum of squares but also a power of an even number, for example, or using another nonlinear function, as exemplified by calculating the amplitude of an optical signal in each polarization from its I component and Q component.

The frequency filter unit 1232 extracts only the clock component of the frequency f/n given by the pseudo RZ signal from the output of the intensity detection unit 1231. The phase detection unit 1233 detects the phase from the clock component of the frequency f/n extracted by the frequency filter unit 1232. This phase represents a deviation of the signal inputted into the timing extracting unit 1230 from the optimum sampling timing, and the timing extracting unit 1230 outputs it as a timing error signal.

The frequency filter unit 1232 can be configured as an FIR (Finite Impulse Response) filter whose tap number is equal to L. In this case, the phase detected in the phase detection unit 1233 is expressed by the following formula:

$$\arg[\Sigma_{k=0}^{L-1} I(k)\exp(-i\pi k/n)] \quad (1)$$

Here, "arg" represents an argument of a complex number, and I(k) represents a calculated intensity. If the k-th samples, into which signals of I component and Q component in each of X polarization and Y polarization are AD-converted, are represented by $x_I(k)$, $x_Q(k)$, $y_I(k)$, and $y_Q(k)$, respectively, I(k) is expressed as follows:

$$I(k) = x_I^2(k) + x_Q^2(k) + y_I^2(k) + y_Q^2(k) \quad (2)$$

When a phase is calculated in a range of $(-\pi, \pi]$, the phase at the timing point corresponding to a dip generated by the pseudo RZ signal becomes equal to it because of detecting the phase in a clock component of the frequency f/n. The phase changes from $-\pi$ to $\pi$ in the time interval of n-times unit interval (nUI) which continues until the next dip generated by the pseudo RZ signal. Accordingly, a value of "e" expressed in the following formula (3) represents an absolute amount of the deviation of the sampling timing, using 1 UI as a unit.

$$e = \frac{n}{2\pi}\arg\left[\sum_{k=0}^{L-1} I(k)\exp\left(-\frac{i\pi k}{n}\right)\right] \quad (3)$$

Here, "e=0" is achieved when the timing point corresponding to the center of two dips generated by consecutive pseudo RZ signals coincides with the sampling timing point of the sample of k=0.

The timing error signal outputted from the timing extracting unit 1230 is inputted into the interpolation unit 1222. On the basis of this timing error signal, the interpolation unit 1222 adjusts the timing on the input signal and outputs interpolated samples.

Figure 4:
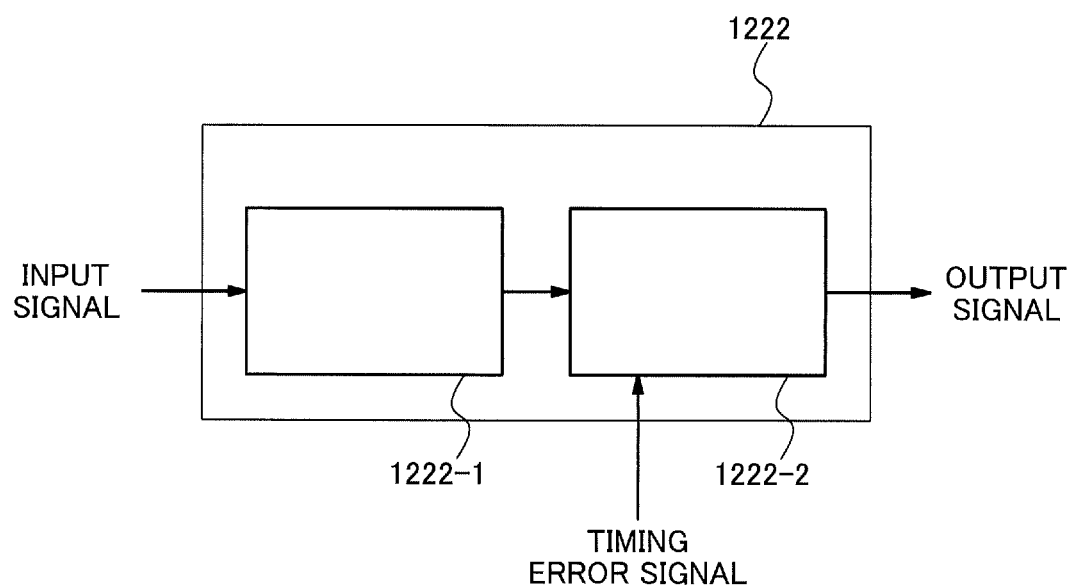
FIG. 4 is a block diagram showing a configuration of an interpolation unit in accordance with the first exemplary embodiment of the present invention.

FIG. 4 shows an example of the configuration of the interpolation unit 1222. The interpolation unit 1222 performs resampling by optimizing the sampling phase keeping the sampling frequency. In the interpolation unit 1222, first, an N-times interpolation unit 1222-1 performs interpolation where the sampling frequency is made N times on the inputted signal and generates a signal stream with 2N samples per symbol. Next, a 1/N times downsampling unit 1222-2 performs processing for returning the sampling frequency to that of two samples per symbol by performing 1/N times downsampling on the generated signal stream.

Here, when performing the downsampling, there are N degrees of freedom in the way to select the timing of the sample for extraction. By controlling this using the timing error signal which is the output of the timing extracting unit 1230, optimization of sampling timing is achieved. In a case of sampling two times per symbol, the sampling timing becomes equivalent even if there is a deviation in sampling timing by an integral multiple of 0.5 UI. Accordingly, the timing error signal "e" expressed by the above-described formula (3) is divided by 0.5 and a remainder is obtained. Furthermore, the remainder is quantized into N different values. Since the timing error signal "e" directly represents a deviation in sampling timing, the quantization is performed by using the regions obtained by dividing the range of (−0.5, 0.5] into N equal parts. By relating these quantized timing error signals to N different selecting ways of timing in downsampling, timing optimization can be performed.

That is to say, if a quantized timing error signal detected in the timing extracting unit 1230 is equal to an index $N_{e0}$ corresponding to e=0, the same sample as that before interpolation is selected in downsampling. On the other hand, if a quantized timing error signal is equal to an index $N_{e0}+1$ corresponding to e=½N, for example, a sample is selected in downsampling which appears earlier than the sample before interpolation by one sample interval. By performing such control, it is possible that samples resampled with optimum sampling timing are certainly included in the output of the interpolation unit 1222. Further, by performing ½N times downsampling on a signal stream with 2N samples per symbol setting an initial phase for a timing point to become e=0.5, it is possible to resample the signal stream into that with one sample per symbol with optimum timing. The function of the interpolation unit 1222 described above can be replaced by one interpolation filter whose response is controlled by the output of the timing extracting unit 1230.

Alternatively, it can be proposed that the bandwidth of the filter 1212 of a low-pass filter is limited to being equal to or lower than (1−1/n)*f/2 as against the clock component of the frequency f/n given at the transmission side. In this case, the sampling frequency of the AD converter 1213 can be further reduced, and it also becomes possible to set it for a value almost equal to the clock frequency. In this case as well, the timing can be extracted by the above-described method in a similar way. Thus, by resampling the input signal on the basis of the output of the timing extracting unit 1230, optimization of the timing in AD conversion can be effectively accomplished.

As mentioned above, according to the optical transmitting/receiving system 1000 of the present exemplary embodiment, an increase in the cost and an increase in the power consumption can be suppressed because the sampling frequency of the AD converter can be reduced.

By the way, the difference in the frequency of a reference clock between a transmitter apparatus and a receiver apparatus is normally extremely small such as about $10^{-5}$ to $10^{-2}$ times value of the baud rate as described in non patent literature 1. Therefore, as mentioned above, the optical receiver apparatus 1200 can treat the baud rate of an optical signal transmitted by the optical transmitter apparatus 1100 as already known. Accordingly, the tap number L of the filter 1212 can be selected so that a deviation of the timing in AD conversion can be regarded as constant.

Figure 5:
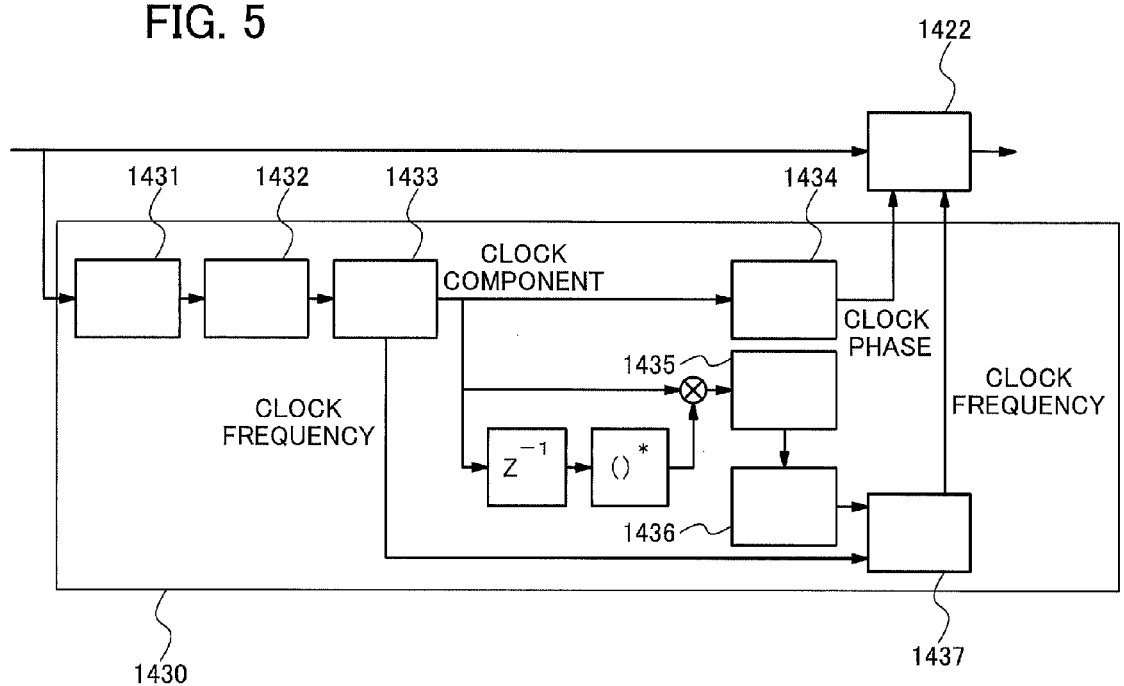
FIG. 5 is a block diagram showing a configuration of another timing extracting unit in accordance with the first exemplary embodiment of the present invention.

On the other hand, if interpolation can be performed with an accurately obtained baud rate, it becomes possible to reduce the degradation in interpolation due to regarding a deviation in the timing point of a sample as constant. FIG. 5 shows a configuration of an alternative timing extracting unit 1430 according to the present exemplary embodiment which can reduce such degradation in interpolation.

In the timing extracting unit 1430, an intensity detection unit 1431 detects the intensity from a sampled signal, and a discrete Fourier transform unit 1432 performs discrete Fourier transform on the output of the intensity detection unit 1431 to transform it into frequency components. A clock component detection unit 1433 discriminates the frequency of the clock component in the signal transformed into frequency components. Because the clock component in this case shows peak intensity on the frequency axis, the clock component detection unit 1433 decides a frequency for which the intensity is at the maximum on the frequency axis.

Here, if the received optical signal is a pseudo RZ signal, this signal includes a clock component of the frequency f generated by the normal QPSK modulation and clock components of the frequency f/n generated by the pseudo RZ carver and its harmonics. In order to decide the frequency of the clock component of the frequency f/n correctly from that signal, it is desirable to limit a range in which the clock component detection unit 1433 searches a frequency with the maximum intensity. That is to say, it is desirable to limit the range so as to eliminate a possibility that a clock component of another frequency, such as $f_r/n \pm f_r/(2N)$, is decided from a frequency of the clock component assumed by the optical receiver apparatus.

In this way, the clock component detection unit 1433 derives a frequency of the clock component corresponding to the frequency f/n, and outputs the frequency value and the frequency component of the corresponding signal, respectively. The phase of the frequency component corresponding to the frequency f/n of the signal is detected in a first phase detection unit 1434, and the phase information is sent out to an interpolation unit 1422. Using this phase information, the interpolation unit 1422 controls the phase of resampling by using the method described above.

On the other hand, a frequency value of the clock component corresponding to the frequency f/n, which is outputted from the clock component detection unit 1433, is inputted into a clock frequency calculation unit 1437. The accuracy of this frequency value is determined by the size of discrete Fourier transform performed by the discrete Fourier transform unit 1432. That is to say, if the sampling frequency of AD conversion is represented by $2f_r$ and the sample number of discrete Fourier transform is represented by L, the frequency resolution becomes equal to $2f_r/L$.

Here, if the size of discrete Fourier transform is increased in order to improve the frequency resolution, the circuit scale required for calculation increases. Accordingly, the timing extracting unit 1430 in the present exemplary embodiment employs a configuration where the correction is performed by calculating a residual error of the frequency value obtained in the clock component detection unit 1433 by getting a difference on the time axis with respect to the phase of the clock component, as described below.

If the sample number of discrete Fourier transform is represented by L, the clock component detection unit 1433 outputs a frequency value and its frequency component per time interval of $L/(2f_r)$. In this case, the clock component detection unit 1433 cannot recognize a frequency difference smaller than $2f_r/L$. However, even if such a frequency difference exists, because the phase of a frequency component outputted from the clock component detection unit 1433 varies with time, the frequency difference can be calculated from its variation.

In order to calculate a value of time variation in the phase of the frequency component, the frequency component outputted from the clock component detection unit 1433 is multiplied by the complex conjugate of a frequency component delayed by a time interval of $L/(2f_r)$, and then, the phase is detected by a second phase detection unit 1435. From the phase φ obtained by the second phase detection unit 1435, it is found that the residual error of the frequency outputted from the clock component detection unit 1433 is equal to $f_r \phi/(\pi L)$.

The phase obtained by the second phase detection unit 1435, from which the noise influence is removed by a filter unit 1436 including an appropriate filter such as a low pass filter, is sent out to a clock frequency calculation unit 1437. The clock frequency calculation unit 1437 calculates a baud rate of the received signal on the basis of the frequency value received from the clock component detection unit 1433 and the frequency residual error obtained by the phase received from the second phase detection unit 1435. That is to say, if the frequency value received from the clock component detection unit 1433 is equal to $f_r/n$, and the phase received from the second phase detection unit 1435 is equal to φ, the clock frequency calculation unit 1437 calculates that the baud rate of the received signal is equal to $f_r + n f_r \phi/(\pi L)$.

The baud rate of the received signal obtained in the clock frequency calculation unit 1437 is sent out to the interpolation unit 1422, which controls the sampling frequency at interpolation so as to coincide with the baud rate. It can be also adopted that depending on a sampling frequency necessary for main signal processing, the sampling frequency at interpolation is controlled so as to coincide with the double of the obtained baud rate of the received signal, for example.

By the above processing steps, the desired sampling frequency and sampling phase are both inputted into the interpolation unit 1422. Accordingly, since all timing points at which extraction is to be performed by interpolation for the inputted signal can be calculated, it is possible to obtain a signal resampled at the optimum timing by performing the interpolation.

Figure 6:
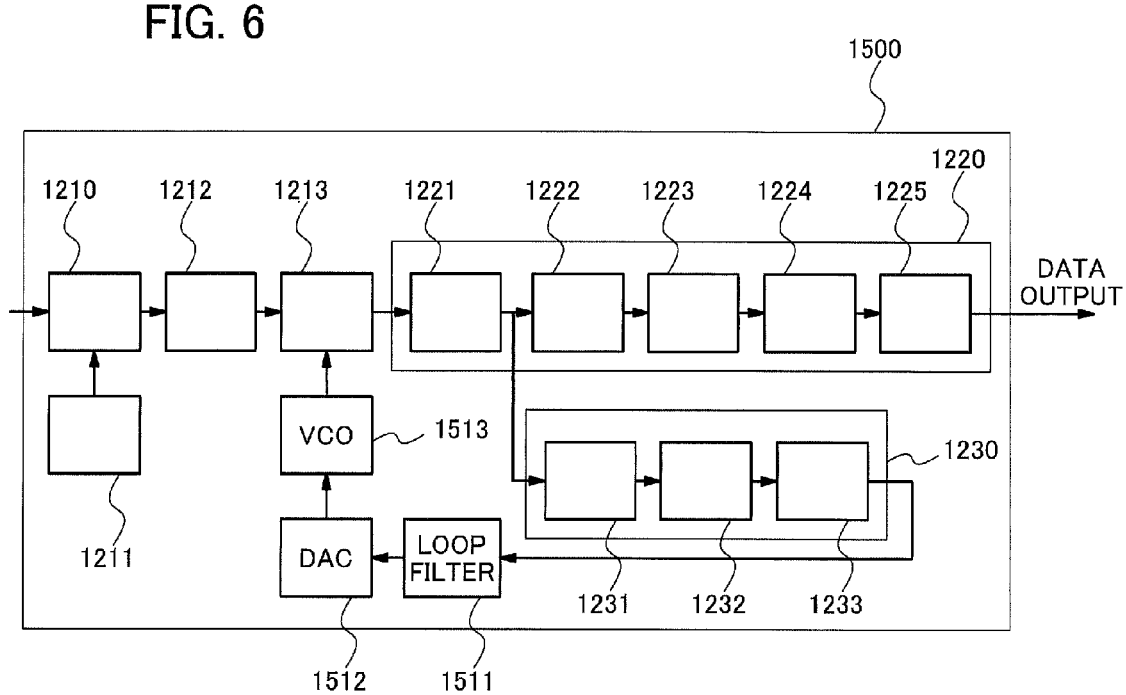
FIG. 6 is a block diagram showing a configuration of another optical receiver apparatus in accordance with the first exemplary embodiment of the present invention.

The timing optimization process can be performed by a feedback type process. FIG. 6 shows a configuration of an optical receiver apparatus 1500 using a feedback type process. The optical receiver apparatus 1500 is provided with a loop filter 1511, a DA converter (DAC) 1512 and, a voltage controlled oscillator (VCO) 1513, for adjusting the sampling timing of the AD converter 1213:

In the optical receiver apparatus 1500, the operation performed at the interpolation unit 1222 in the main signal processing unit 1220 becomes a mere decimation process. The output of the timing extracting unit 1230 passes thorough the loop filter 1511, then is converted into an analog value by the DA converter 1512, and then is fed back to the voltage controlled oscillator (VCO) 1513 which generates a clock to drive the AD converter 1213. By using such configuration, it becomes possible to process a signal sampled at the appropriate timing by the main signal processing unit 1220.

Next, an example of a specific configuration of the optical transmitting/receiving system 1000 according to the present exemplary embodiment will be described using FIG. 1. The optical signal transmitted from the optical transmitter apparatus 1100 passes through the transmission line 1300, and then is received by the optical receiver apparatus 1200. The optical receiver apparatus 1200 extracts the timing from the samples which are obtained by AD conversion after coherent detection of the received optical signal. The case will be described below where a timing error signal is derived from a pseudo RZ DP-QPSK signal with 112 Gb/s by the timing extracting unit 1230 included in the optical receiver apparatus 1200.

The optical transmitter apparatus 1100 performs QPSK modulation on an optical carrier from the light source 1110 with a baud rate of 28 GHz by using the optical modulator 1120. The modulated optical signal is given an intensity dip which drops the optical intensity at a symbol transition point to zero "0" per 4-symbol interval by the pseudo-RZ carver 1130. Accordingly, the optical signal transmitted from the optical transmitter apparatus 1100 includes a frequency component of a frequency f/4=28 GHz and its harmonic components in addition to the clock component of f=28 GHz. After polarization multiplexing, 28 Gbaud pseudo RZ(4)-QPSK optical signal is outputted.

The optical signal transmitted from the optical transmitter apparatus 1100 passes through the transmission line 1300, and then is received by the optical receiver apparatus 1200. The optical receiver apparatus 1200 detects the received optical signal by mixing it with the local oscillating light from the local oscillating light source 1211 by using the coherent receiver 1210. From the coherent receiver 1210, electrical signals are outputted which have the information about I component and Q component in each of X polarization and Y polarization.

These electrical signals are AD converted by the AD converter 1213. The sampling frequency at this time is equal to 56 Gsamples/sec, which is twice as high as the clock frequency. It is assumed that the AD converter 1213 has a limited analog bandwidth, and this frequency characteristic serves as an anti-aliasing filter. Therefore, the configuration without the filter 1212 as a low pass filter can be also adopted.

The signals AD converted by the AD converter 1213 are inputted into the main signal processing unit 1220. The signals inputted into the main signal processing unit 1220 are sequentially processed by the dispersion compensation unit 1221, the interpolation unit 1222, the polarization demultiplexing unit 1223, the carrier phase compensation unit 1224, and the data decision unit 1225, and then the recognized data are outputted.

The signals dispersion-compensated by the dispersion compensation unit 1221 are inputted into the timing extracting unit 1230, where a timing error signal is calculated. In the timing extracting unit 1230, first, the intensity detection unit 1231 calculates the intensity by calculating a sum of squares of the signals of I component and Q component in each of X polarization and Y polarization. The output of the intensity detection unit 1231 passes through the frequency filter unit 1232 corresponding to a band-pass filter with a center frequency of f/4=7 GHz. As a result, only a clock component of the frequency f/4=7 GHz due to pseudo RZ is extracted.

The phase of the clock component of the frequency f/4 extracted by the frequency filter unit 1232 is detected by the phase detection unit 1233. The timing extracting unit 1230 outputs the phase as a timing error signal. This timing error signal is inputted into the interpolation unit 1222, and the timing is optimized by resampling which is controlled by the timing error signal.

Figure 7:
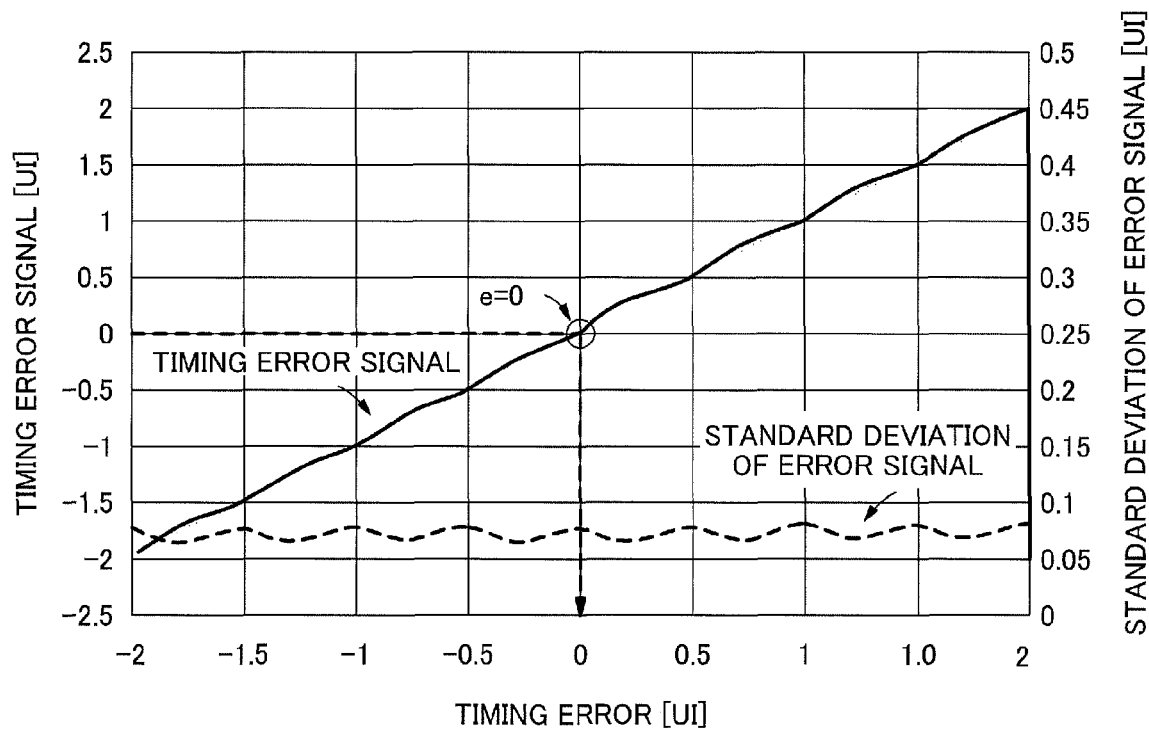
FIG. 7 is a diagram showing a result of calculating a timing error signal by computer simulation with respect to an optical transmitting/receiving system in accordance with the first exemplary embodiment of the present invention.

FIG. 7 shows timing error signals in emulating a timing error by numerical calculation with respect to the optical transmitting/receiving system 1000 according to the present exemplary embodiment. The solid line represents the timing error signal and the dashed line represents the standard deviation of the timing error signal. Each point of the timing error signal is obtained by averaging 64 times, and the variation in the timing error is set for ±2 UI. This corresponds to one cycle of the clock component of the frequency f/4. It is found from the figure that the timing error signal shows the good linearity within the range of ±2 UI and takes a value corresponding one-on-one to a timing error. Therefore, the optical transmitting/receiving system 1000 in the present exemplary embodiment enables a feed forward type of optimization. The range in which a deviation in timing can be detected from this timing error signal is a range within ±2 UI from the optimized point. Because this range corresponds to one cycle of the clock component of the frequency f/4 due to the pseudo RZ(4), the timing error signal has a period of 4/f.

The resampling can be performed by using an interpolation filter which has an impulse response determined by the timing error signal "e", for example. In the case of feedback control, a normal PID control can be performed on the timing error signal "e". Since the timing error signal inverts its sign around a timing of e=0, the sampling timing which gives e=0 can be achieved by the control of feed back to a sampling timing in the AD converter using the timing error signal.

The Second Exemplary Embodiment

Figure 8:
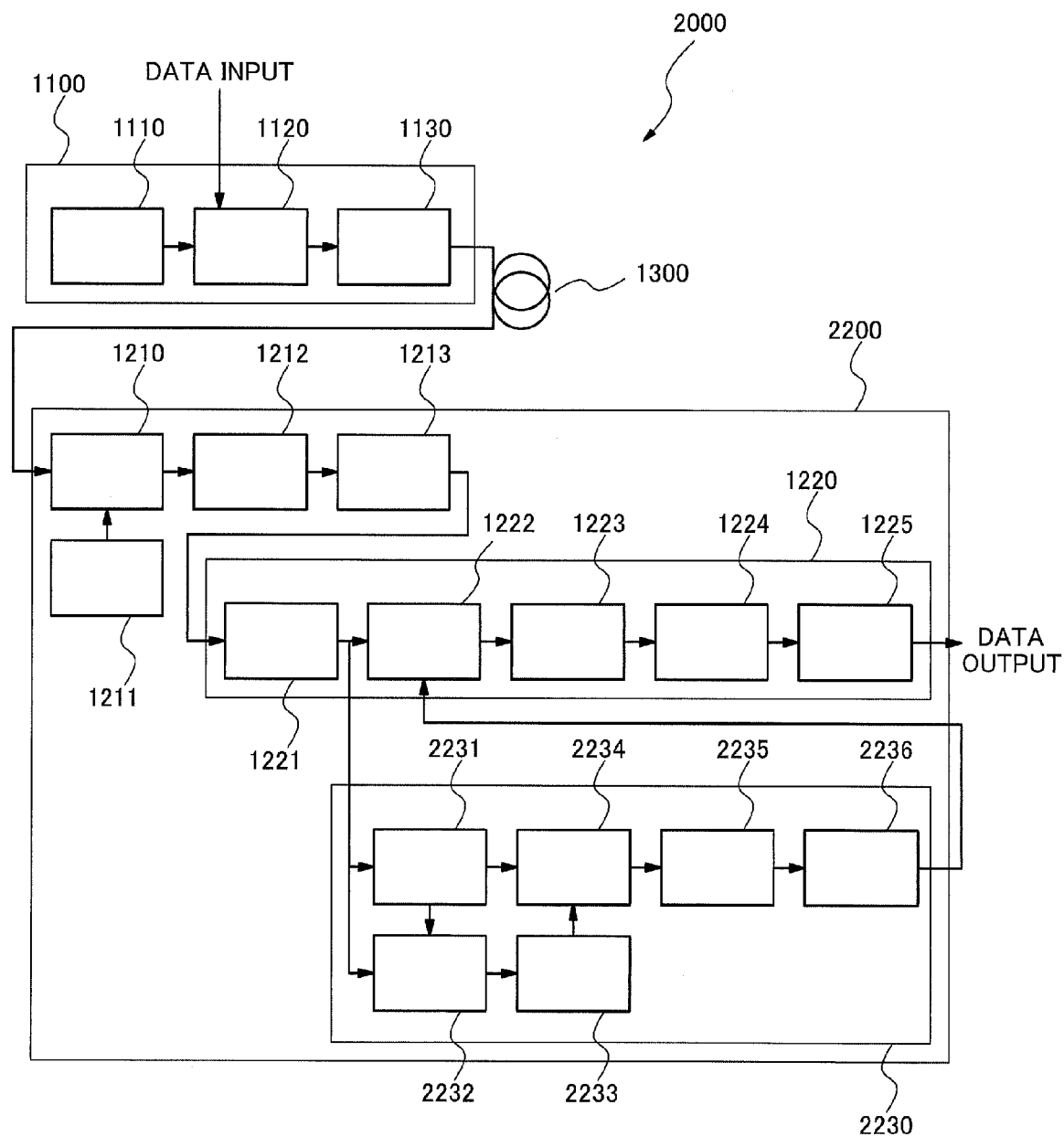
FIG. 8 is a block diagram showing a configuration of an optical transmitting/receiving system in accordance with the second exemplary embodiment of the present invention.

Next, the second exemplary embodiment of the present invention will be described. FIG. 8 is a block diagram showing the configuration of an optical transmitting/receiving system 2000 in accordance with the second exemplary embodiment of the present invention. In the optical transmitting/receiving system 2000, the configuration of a timing extracting unit 2230 in an optical receiver apparatus 2200 is different from that in the optical transmitting/receiving system 1000 of the first exemplary embodiment and the other configurations are similar to them. With respect to components similar to those in the first exemplary embodiment, the same codes are used and their detail descriptions are omitted.

The timing extracting unit 2230 in the optical receiver apparatus 2200 is different from that in the first exemplary embodiment in that it is provided with a downsampling unit 2232, a differential phase detection unit 2233, and a signal substitution unit 2234 in addition to the components of the timing extracting unit 1230 in the first exemplary embodiment. Here, the configurations of an intensity detection unit 2231, a frequency filter unit 2235, and a phase detection unit 2236 are similar to those in the first exemplary embodiment. In the present exemplary embodiment, QPSK modulation or even higher multilevel phase modulation is performed at the optical modulator 1120 in the optical transmitter apparatus 1100, and signals which are not multiplexed by polarization will be described below.

Figure 9:
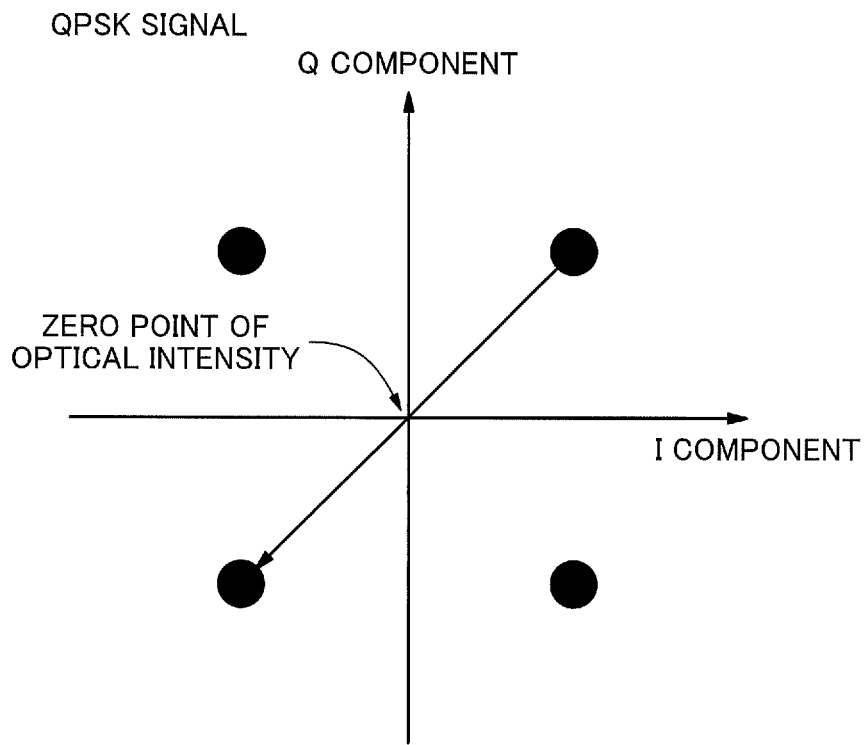
FIG. 9 is a diagram showing an example of the transition where a phase between symbols becomes equal to 180° in QPSK signals.

The optical intensity of the pseudo RZ signal generated by the pseudo RZ carver 1130 becomes zero "0" at a symbol transition point per n-symbol interval. Except at the dip due to the pseudo RZ, if a phase between two successive symbols becomes 180° by phase modulation, the optical intensity at the symbol transition point becomes zero "0" as is the case with the dip due to the pseudo RZ. Such a situation is illustrated in FIG. 9 in the case of the QPSK modulated signal.

The timing extracting unit 2230 decides on such a symbol transition and performs the process for substituting the optical intensity at that point with an average of optical intensities of the previous and next point. By using this configuration, the accuracy of the phase of a clock component of the frequency f/n detected in the timing extracting unit 2230 can be improved.

A signal processed by main signal processing steps in the main signal processing unit 1220, for example, a signal after dispersion compensation process, is inputted into the timing extracting unit 2230 in the optical receiver apparatus 2200. This signal is represented by x(k). If I component and Q component of x(k) are represented by $x_I(k)$ and $x_Q(k)$, respectively, then $x(k)=x_I(k)+ix_Q(k)$.

This signal x(k) is inputted into the intensity detection unit 2231 and the downsampling unit 2232 in the timing extracting unit 2230, respectively. The intensity detection unit 2231, using the x(k), calculates I(k)=|x(k)|² corresponding to the intensity, and outputs it to the signal substitution unit 2234 and the downsampling unit 2232, respectively.

The downsampling unit 2232 performs ½ times downsampling so as to obtain a signal with one sample per symbol. At that time, the output of the downsampling unit 2232 becomes equal to either {x(2m)} or {x(2m+1)}. Which is selected between them is controlled by the signal from the intensity detection unit 2231. For example, comparing I(2m) and I(2m+1), x(2m) is outputted if I(2m)>I(2m+1), and x(2m+1) is outputted in other cases.

Here, the case will be described where the downsampling unit 2232 selects and outputs {x(2m)}. The output {x(2m)} from the downsampling unit 2232 is inputted into the differential phase detection unit 2233, in which a phase difference between two successive symbols is detected. The phase detected by the differential phase detection unit 2233 is equal to arg[x(2m)x*(2m−2)]. The phase difference in this time is decided on by substituting it with one of four values of −90°, 0°, 90°, and 180° in the case of a QPSK modulated signal, for example. If this phase difference is equal to 180°, it is found that x(2m−1) is a sample which has been sampled at the transition where the phase between two successive symbols is equal to 180°.

The differential phase detection unit 2233 combines the detected phases with the information about which has been selected between {x(2m)} and {x(2m+1)} by the downsampling unit 2232, and outputs the signal which decides on the transition where a phase between two symbols becomes equal to 180°. For example, it is assumed that signals of [x(2m+2), x(2m+1), x(2m), x(2m−1), x(2m−2)] are inputted into the timing extraction unit 2230 and that the phase difference between x(2m) and x(2m−2) is found to be equal to 180° in the differential phase detection unit 2233. In this case, the differential phase detection unit 2233 outputs [0, 0, 0, 1, 0].

The signal to decide on the transition where a phase between previous and next two symbols becomes equal to 180° is inputted into the signal substitution unit 2234 as a control signal for signal substitution. In the above-mentioned example, the output value of "1" is related to the ON-operation and "0" are related to ON-operation and the output value of "0" is related to the OFF-operation of the signal substitution process, respectively.

Figure 10:
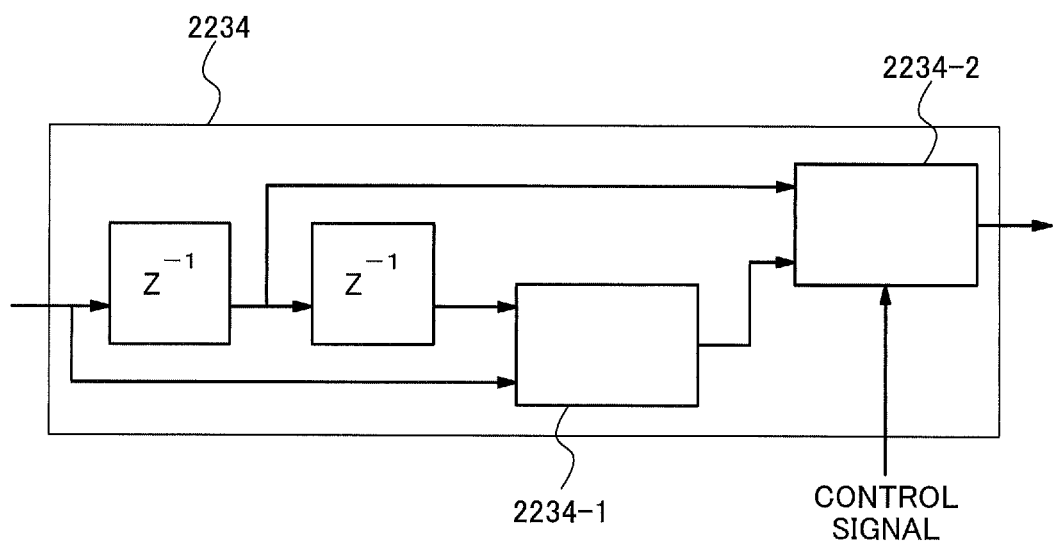
FIG. 10 is a block diagram showing a configuration of a signal substitution unit included in the optical receiver apparatus in accordance with the second exemplary embodiment of the present invention.

FIG. 10 shows an example of a configuration of the signal substitution unit 2234. Two signals are inputted into the signal substitution unit 2234, that is, one is an intensity signal which is outputted from the intensity detection unit 2231, and the other is a control signal which decides on the transition where a phase between the previous and next symbols outputted from the differential phase detection unit 2233 becomes equal to 180°.

Figure 11:
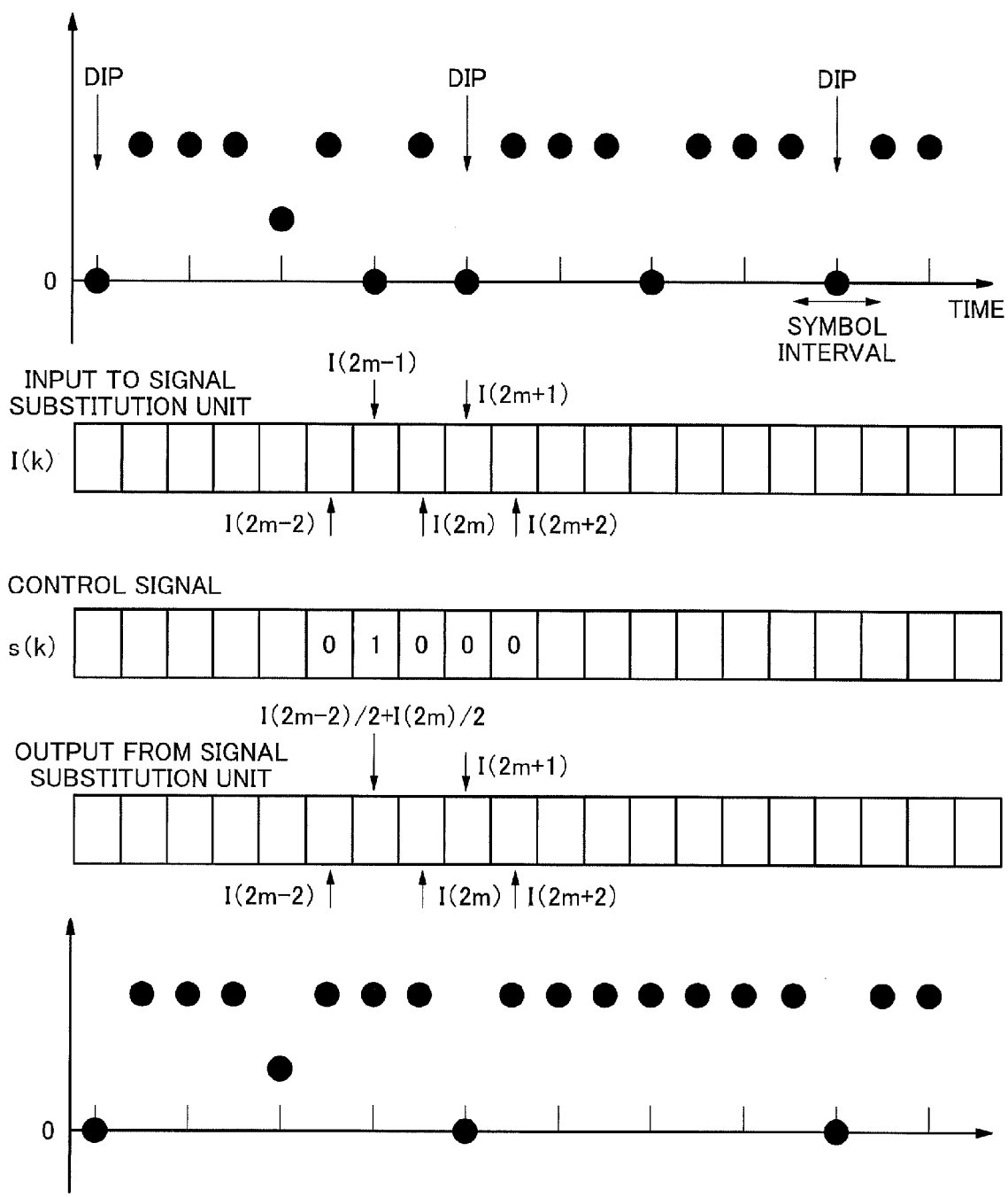
FIG. 11 is a schematic signal diagram for illustrating the operation of the signal substitution unit included in the optical receiver apparatus in accordance with the second exemplary embodiment of the present invention.

Next, the operation of the signal substitution unit 2234 will be described with reference to FIG. 11. Here, the case will be described as an example where signals of [ . . . x(2m+2), x(2m+1), x(2m), x(2m−1), x(2m−2) . . . ] are inputted into the timing extraction unit 2230, and the phase difference between x(2m) and x(2m−2) is equal to 180°.

Intensity signals of [ . . . I(2m+2), I(2m+1), I(2m), I(2m−1), I(2m−2) . . . ] and control signals of [ . . . 0, 0, 0, 1, 0 . . . ] are inputted into the signal substitution unit 2234. In the signal substitution unit 2234, an average calculation unit 2234-1 averages one sample of the intensity signal and the other sample delayed by two samples behind that one, and calculates the following signals:
[ . . . (I(2m+3)+I(2m+1))/2, (I(2m+2)+I(2m))/2, (I(2m+1)+I(2m−1))/2, I(2m)+I(2m−2))/2, (I(2m−1)+I (2m−3))/2 . . . ]

These signals are inputted into a substitution unit 2234-2 along with the original intensity signals of [ . . . I(2m+2), I(2m+1), I(2m), 1(2m−1), I(2m−2) . . . ]. The signal, which decides on the transition where a phase between the previous and next symbols outputted from the differential phase detection unit 2233 becomes equal to 180°, is simultaneously inputted into the substitution unit 2234-2, and the substitution of signals is controlled.

The timing adjustment is carried out so that intensity signals of I(k), (I(k+1)+I(k−1))/2, and s(k) can be inputted in a line in terms of time into the substitution unit 2234-2. Here, s(k) represents a signal to decide on whether or not the phase difference between x(k+1) and x(k−1) is equal to 180°. Only if the control signal s(k) is equal to "1", the substitution unit 2234-2 substitutes the intensity signal I(k) with the average between the previous and next intensity signals of (I(k+1)+I (k−1))/2 and outputs them. In the above-mentioned example, the output of the substitution unit 2234-2 becomes equal to the following:
[ . . . I(2m+2), I(2m+1), I(2m), (I(2m)+I(2m−2))/2, I(2m−2) . . . ]
The signal substitution unit 2234 outputs those signals.

The output of the signal substitution unit 2234 is filtered in the frequency. domain by the frequency filter unit 2235, and only a clock component of the frequency f/n is extracted. The phase of the output of the frequency filter unit 2235 is detected by the phase detection unit 2236, and is outputted as a timing error signal.

The operation at the subsequent stages of the signal substitution unit 2234 in the timing extracting unit 2230 and the timing optimization process subsequent to that are similar to those in the first exemplary embodiment.

In the present exemplary embodiment, before performing frequency filtering, the intensity of a sample at the timing, when the intensity becomes equal to "0" except at the dip due to the pseudo RZ, is substituted with the average between the intensities of the previous and next samples. Therefore, the accuracy in phase detection of a clock component of the frequency f/n can be improved.

The above-mentioned present exemplary embodiment has been described using signals which are not multiplexed by polarization. However, if the polarization multiplexed signals are received, it is possible that the differential phase detection processing and the signal substitution processing are independently performed on each polarization. Then, the above-mentioned frequency filtering processing can be performed on a substituted intensity signal of each polarization, and the timing error can be detected.

Similarly to the first exemplary embodiment, the configuration of the timing extracting unit 1430 shown in FIG. 5 can be used for the timing optimization process, and the feedback type configuration shown in FIG. 6 can be also used.

The Third Exemplary Embodiment

Figure 12:
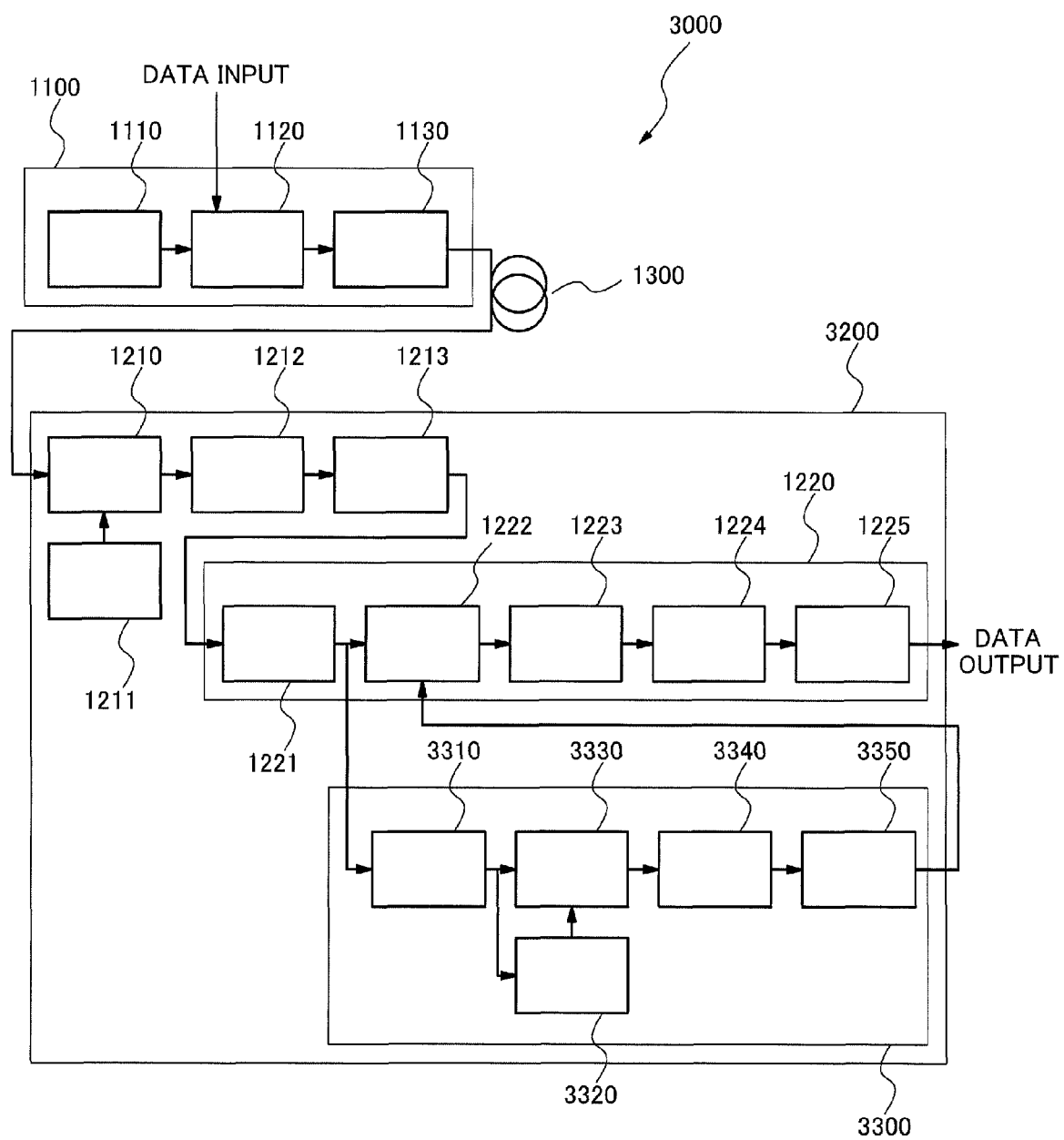
FIG. 12 is a block diagram showing a configuration of an optical transmitting/receiving system in accordance with the third exemplary embodiment of the present invention.

Next, the third exemplary embodiment of the present invention will be described. FIG. 12 is a block diagram showing the configuration of an optical transmitting/receiving system 3000 in accordance with the third exemplary embodiment of the present invention. In the optical transmitting/receiving system 3000, the configuration of a timing extracting unit 3300 in an optical receiver apparatus 3200 is different from that in the optical transmitting/receiving system 1000 of the first exemplary embodiment and the other configurations are similar to them. With respect to components similar to those in the first exemplary embodiment, the same codes are used and their detail descriptions are omitted.

The timing extracting unit 3330 in the optical receiver apparatus 3200 is different from that in the first exemplary embodiment in that it is provided with a pseudo RZ dip decision unit 3320 and a signal substitution unit 3330 in addition to the components of the timing extracting unit 1230 in the first exemplary embodiment. Here, the configurations of an intensity detection unit 3310, a frequency filter unit 3340, and a phase detection unit 3350 are similar to those in the first exemplary embodiment.

The timing extracting unit 3300 decides on a sample corresponding to a timing of a dip due to the pseudo RZ signal and performs the process for substituting optical intensities in symbol transition points except it with an average of optical intensities of the previous and next point. By using this configuration, the accuracy of the phase of a clock component of the frequency f/n detected in the timing extracting unit 3300 can be further improved.

A signal processed by main signal processing steps in the main signal processing unit 1220, for example, a signal after dispersion compensation process, is inputted into the timing extracting unit 3300 in the optical receiver apparatus 3200. This signal is represented by x(k). This signal x(k) is inputted into the intensity detection unit 3310 in the timing extracting unit 3300. The intensity detection unit 3310, using the x(k), calculates $I(k)=|x(k)|^2$ corresponding to the intensity, and outputs it to the pseudo RZ dip detection unit 3320 and the signal substitution unit 3330, respectively.

Figure 13:
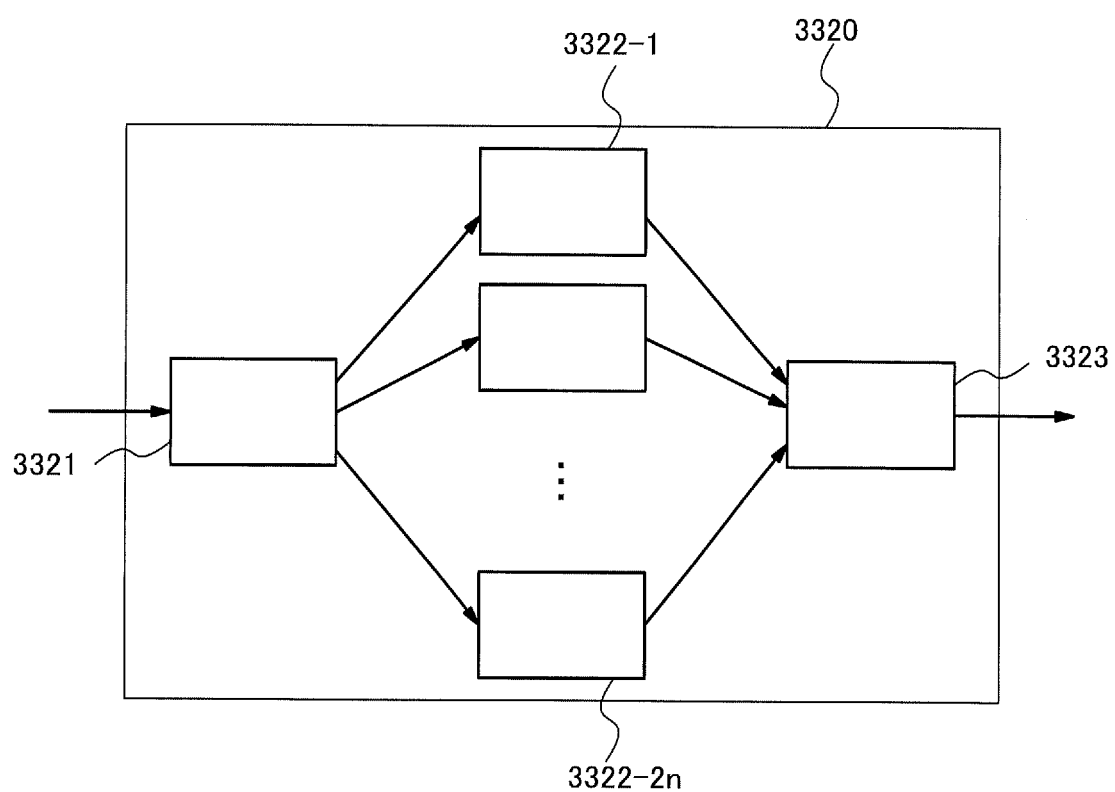
FIG. 13 is a block diagram showing a configuration of a pseudo RZ dip decision unit included in the optical receiver apparatus in accordance with the third exemplary embodiment of the present invention.

FIG. 13 shows an example of a configuration of the pseudo RZ dip decision unit 3320. The pseudo RZ dip decision unit 3320 decides on a sample corresponding to a dip due to pseudo RZ on the basis of the input signal from the intensity detection unit 3310, and outputs a control signal to control signal substitution processing in the signal substitution unit 3330. The intensity signal {I(k)} inputted into the pseudo RZ dip decision unit 3320 is sent to a distribution unit 3321. The distribution unit 3321 outputs the intensity signal to accumulators 3322, switching an output destination from a first accumulator 3322-1 to a 2n-th accumulator 3322-2n per sample in turn.

A switching cycle 2n/(2f) of the output destination in the distribution unit 3321 is equal to the time interval between two successive dips in the pseudo RZ signals. Each of the accumulators 3322 accumulates the inputted signals for a certain period of time. A time period, during which a deviation in timing of AD conversion can be considered to be constant, is selected as the accumulation time. The output of the t-th accumulator 3322-t is expressed by the following formula (4).

$$\Sigma_k I(2nk+t-1) \quad (4)$$

The signal accumulated in each of the accumulators 3322 is outputted to a minimum value decision unit 3323. Here, assuming that a sample of x(2nk+d−1) corresponds to a sampling at a dip due to the pseudo RZ signal, since the sampling is performed at the dip due to the pseudo RZ signal, I(2nk+d−1) always takes a value close to zero "0" independently of a value of k. Accordingly, the output of the d-th accumulator 3322-d becomes smaller than an output of any other accumulator. Using this principle, the minimum value decision unit 3323 decides on a minimum one among the outputs of the accumulators. For example, if the output of the d-th accumulator 3322-d is the minimum, the minimum value decision unit 3323 decides that {x(2nk+d−1)} is the sample at the dip due to the pseudo RZ signal. The pseudo RZ dip decision unit 3320 outputs this signal as an identification signal to the signal substitution unit 3330.

Figure 14:
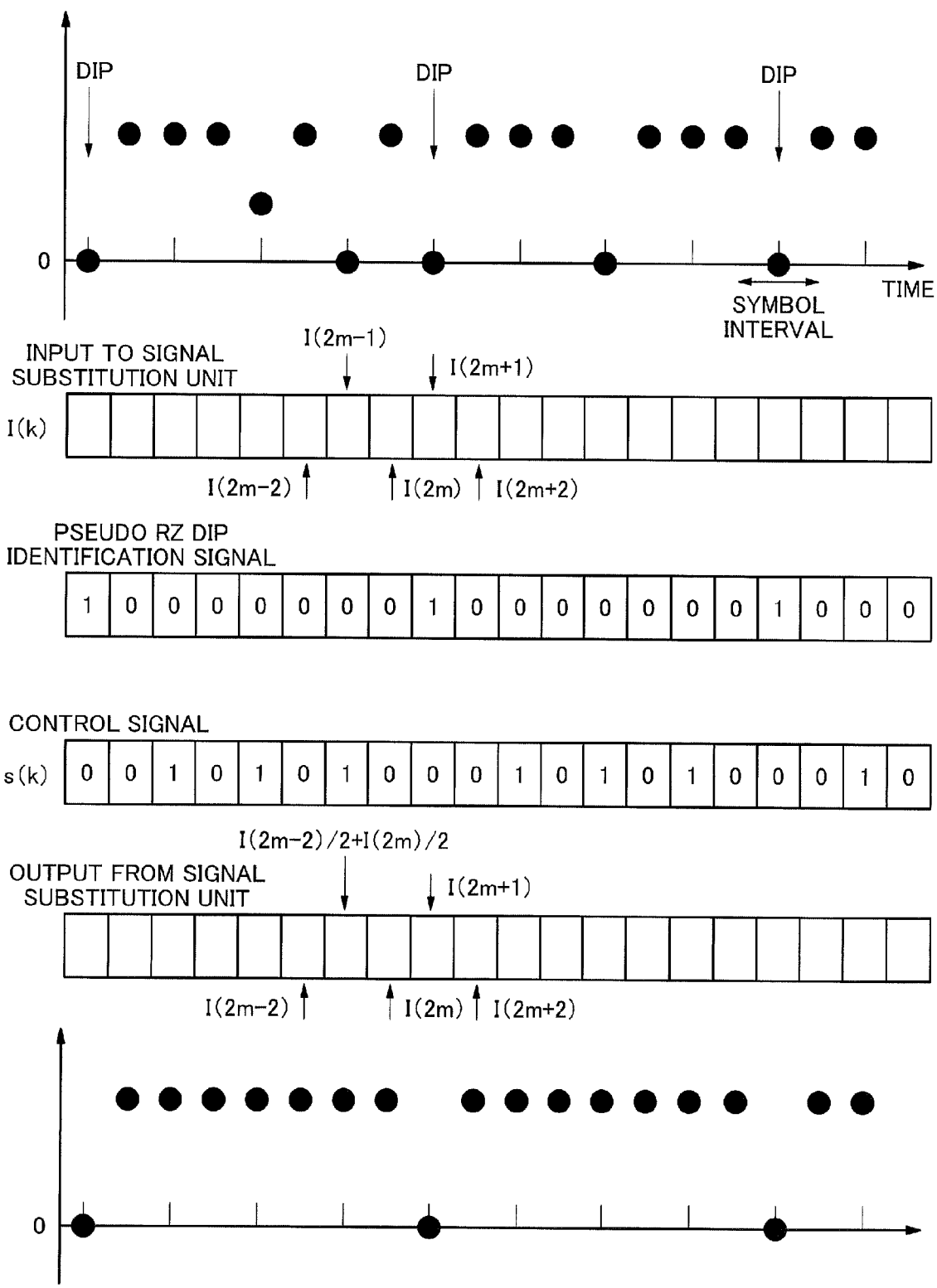
FIG. 14 is a schematic signal diagram for illustrating the operation of the signal substitution unit included in the optical receiver apparatus in accordance with the third exemplary embodiment of the present invention.

Next, the operation of the signal substitution unit 3330 will be described with reference to FIG. 14. The configuration of the signal substitution unit 3330 is the same as that of the signal substitution unit 2234 in the second exemplary embodiment shown in FIG. 10. The signal substitution unit 3330 performs the process for substituting an intensity signal at a symbol transition point except a dip due to the pseudo RZ signal with the average of the previous and next intensity signals. For that purpose, the identification signal outputted by the pseudo RZ dip decision unit 3320 is transformed into a control signal s(k) by a transformation unit which is not illustrated. For example, the transformation is carried out so that s(k) is set for "0" with a dip due to the pseudo RZ signal, for "1" with symbol transition points except a dip due to the pseudo RZ signal, and for "0" with any other points. This transformation process can be easily carried out if a sample corresponding to a dip due to the pseudo RZ signal is known. And then, if the intensity signal I(k) inputted from the intensity detection unit 3310 corresponds to a symbol transition point except a dip due to the pseudo RZ signal, the signal substitution unit 3330 substitutes the intensity signal I(k) with the average of the previous and next signals of (I(k+1)+I(k−1))/2 and outputs the resultant signal.

The output from the signal substitution unit 3330 is filtered in the frequency domain by the frequency filter unit 3340, and only a clock component of the frequency f/n is extracted. The phase detection unit 3350 detects a phase from the output of the frequency filter unit 3340 and outputs it as a timing error signal. The operation at the subsequent stages of the signal substitution unit 3330 in the timing extracting unit 3300 and the timing optimization process subsequent to that are similar to those in the first exemplary embodiment.

According to the present exemplary embodiment, before performing frequency filtering, the intensity of a sample at a symbol transition point except a dip due to the pseudo RZ signal is substituted with the average between the intensities of the previous and next samples. Therefore, the accuracy in phase detection of a clock component of the frequency f/n can be improved.

Similarly to the first exemplary embodiment, the configuration of the timing extracting unit 1430 shown in FIG. 5 can be used for the timing optimization process, and the feedback type configuration shown in FIG. 6 can be also used.

Furthermore, even if a modulation method where an optical intensity does not drop to zero "0" such as π/4-shifted QPSK modulation method is used in the optical modulator 1120 included in the optical transmitter apparatus 1100, the same effect is achieved according to the present exemplary embodiment.

Next, an example of a specific configuration of the optical transmitting/receiving system 3000 according to the present exemplary embodiment will be described using FIG. 12. The case will be described as an example below where a timing error signal is derived from a pseudo RZ(4)-DP-QPSK signal with 112 Gb/s by the timing extracting unit 3330 included in the optical receiver apparatus 3200.

The signal which is AD converted by the AD converter 1213 and the dispersion compensation is performed on by the dispersion compensation unit 1221 is inputted into the timing extracting unit 3300, where a timing error signal is calculated. In the timing extracting unit 3300, the intensity detection unit 3310 calculates the intensity by calculating a sum of squares of the signals of I component and Q component in each of X polarization and Y polarization. The output of the intensity detection unit 3310 is inputted into the signal substitution unit 3330 and the pseudo RZ dip decision unit 3320.

As shown in FIG. 13, the pseudo RZ dip decision unit 3320 switches an output destination every single sample with a period of eight samples and accumulates the inputted signals, and decides on a sample corresponding to a dip generated by the pseudo RZ carver 1130 from a minimum value of the accumulated values. The signal, which decides on a dip due to the pseudo RZ signal outputted from the pseudo RZ dip decision unit 3320, is inputted into the signal substitution unit 3330. The signal substitution unit 3330 substitutes the intensity of a sample at a timing point corresponding to a symbol transition except a dip due to pseudo RZ with the average of the previous and next sample intensities.

The frequency filter unit 3340 extracts only the clock component of the frequency f/4=7 GHz due to pseudo RZ from the signal substituted by the signal substitution unit 3330. The phase of the clock component of the frequency f/4 extracted by the frequency filter unit 3340 is detected by the phase detection unit 3350, and then is outputted as a timing error signal by the timing extracting unit 3300. This timing error signal is inputted into the interpolation unit 1222, and the timing is optimized by the resampling process which is controlled by the timing error signal.

Figure 15:
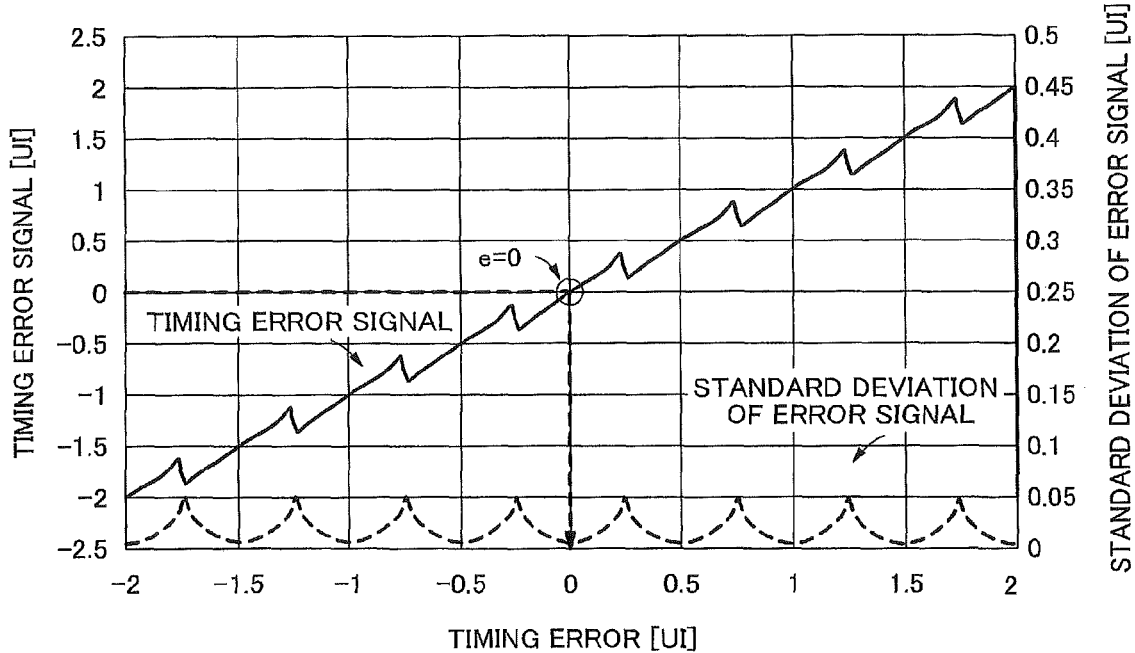
FIG. 15 is a diagram showing a result of calculating a timing error signal by computer simulation with respect to an optical transmitting/receiving system in accordance with the third exemplary embodiment of the present invention.
Figure 16:
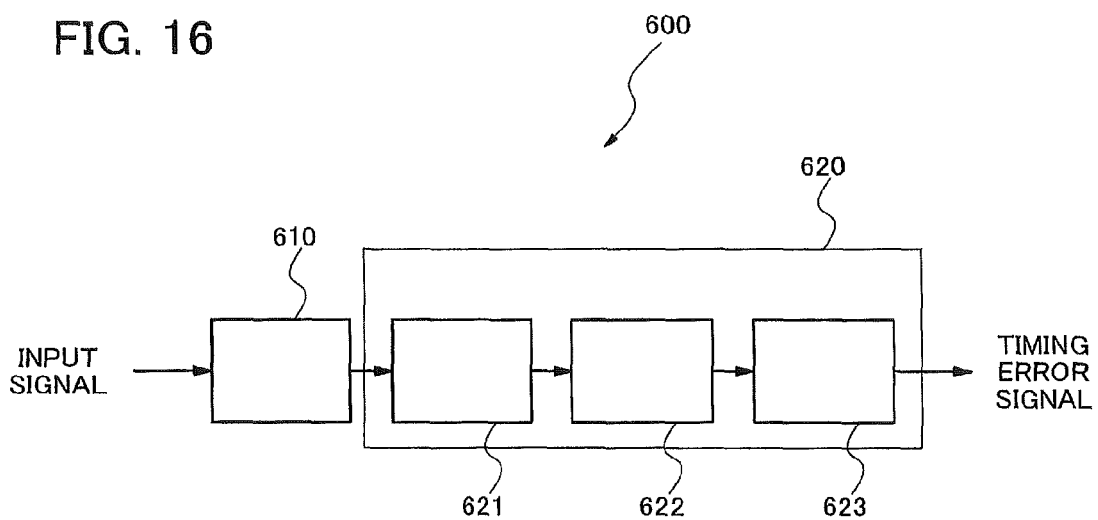
FIG. 16 is a block diagram of a timing error detection apparatus to illustrate the related timing extracting method.

FIG. 15 shows timing error signals in emulating a timing error by numerical calculation with respect to the optical transmitting/receiving system 3000 according to the present exemplary embodiment. The solid line represents the timing error signal and the dashed line represents a standard deviation of the timing error signal. The size of discrete Fourier transform is the same as that in the first exemplary embodiment, and each point is obtained by averaging 64 times. The variation in the timing error is set for ±2 UI. This corresponds to one cycle of the clock component of the frequency f/4. It is found from the figure that the timing error signal shows the good linearity within the range of ±2 UI and takes a value corresponding one-on-one to a timing error. Therefore, the optical transmitting/receiving system 3000 in the present exemplary embodiment enables a feed forward type of optimization. The range in which a deviation in timing can be detected from this timing error signal is a range within ±2 UI from the optimization point. Because this range corresponds to one cycle of the clock component of the frequency f/4 due to the pseudo RZ(4), the timing error signal has a period of 4/f.

Comparing the magnitudes of the standard deviations of the timing error signals shown in FIG. 15 with the results shown in FIG. 7 according to the first exemplary embodiment, it is found that the minimum value decreases to about 15%. That is to say, in the case of the first exemplary embodiment, it is found from FIG. 7 that the standard deviation of the error signal takes a minimum value of about 0.065 when the timing error is equal to 0.25 UI. In contrast, in the case of the present exemplary embodiment, it is found from FIG. 15 that the standard deviation of the error signal takes a minimum value of about 0.01 when the timing error is equal to 0 UI. The reason is as follows: Since the intensity at a symbol transition point except the dip due to the pseudo RZ signal is substituted with the average between the intensities of the previous and next samples in the third exemplary embodiment, the variability of the timing error signal becomes smaller. Because of the reduction in the variability of the timing error signal, the effect of reducing the jitters of the clock component is obtained especially in using the feedback control.

The present invention is not limited to the above-mentioned exemplary embodiments and can be variously modified within the scope of the invention described in the claims. It goes without saying that these modifications are also included in the scope of the invention.

This application is based upon and claims the benefit of priority from Japanese patent application No. 2010-087446, filed on Apr. 6, 2010, the disclosure of which is incorporated herein in its entirety by reference.

DESCRIPTION OF THE CODES 1000, 2000, 3000 optical transmitting/receiving system
1100 optical transmitter apparatus
1110 light source
1120 optical modulator
1130 pseudo RZ carver
1131 PSK modulator
1132 frequency divider
1133 D flip-flop
1134 driver
1200, 1500, 2200, 3200 optical receiver apparatus
1210 coherent receiver
1211 local oscillating light source
1212 filter
1213 AD converter
1220 main signal processing unit
1221 dispersion compensation unit
1222, 1422 interpolation unit
1222-1 N-times interpolation unit
1222-2 1/N times downsampling unit
1223 polarization demultiplexing unit
1224 carrier phase compensation unit
1225 data decision unit
1230, 1430, 2230, 3300 timing extracting unit
1231, 2231, 3310 intensity detection unit
1232, 2235, 3340 frequency filter unit
1233, 2236, 3350 phase detection unit
1300 transmission line
1431 intensity detection unit
1432 discrete Fourier transform unit
1433 clock component detection unit
1434 first phase detection unit
1435 second phase detection unit
1436 filter unit
1437 clock frequency calculation unit
1511 loop filter
1512 DA converter (DAC)
1513 voltage controlled oscillator (VCO)
2232 downsampling unit
2233 differential phase detection unit
2234, 3330 signal substitution unit
2234-1 mean-value calculation unit
2234-2 substitution unit
3320 pseudo RZ dip decision unit
3321 distribution unit
3322 accumulator
3323 minimum value decision unit
600 timing error detection apparatus
610 AD converter
620 timing extracting unit
621 intensity detection unit
622 frequency filter unit
623 phase detection unit

The invention claimed is:

1. An optical transmitting/receiving system, comprising:
an optical transmitter apparatus comprising a light source, an optical modulator, and a periodically Return-to-Zero carver; and
an optical receiver apparatus comprising a coherent receiver, an analog-to-digital (AD) converter, a main signal processing unit, and a timing extracting unit;

wherein the periodically Return-to-Zero carver forms a dip in an optical signal phase-modulated with a frequency f by the optical modulator by dropping the optical intensity at a symbol transition point to approximate zero per n-symbol interval, n representing natural number more than one;

the AD converter outputs a sample obtained by AD converting an electrical signal which is detected and outputted by the coherent receiver;

the timing extracting unit extracts a clock component of a frequency f/n from the sample and derives from a phase of the clock component a timing error signal which represents a deviation from optimum sampling timing; and the main signal processing unit adjusts a sampling timing on the basis of the timing error signal.

2. The optical transmitting/receiving system according to claim 1, wherein the timing extracting unit comprises an intensity detection unit, a frequency filter unit, and a phase detection unit;

the intensity detection unit calculates the intensity of the sample;

the frequency filter unit extracts a clock component of the frequency f/n from the output of the intensity detection unit; and the phase detection unit detects a phase of the clock component of the frequency f/n extracted by the frequency filter unit.

3. The optical transmitting/receiving system according to claim 1, wherein the timing extracting unit decides on a symbol transition in which the optical intensity at a symbol transition point is approximately equal to zero by the phase modulation, and performs the process for substituting the intensity of a sample at the symbol transition point with an average of intensities of the previous and next samples of the symbol transition point.

4. The optical transmitting/receiving system according to claim 1, wherein the timing extracting unit decides on a sample corresponding to the dip formed by the periodically Return-to-Zero carver, and performs the process for substituting the intensity of a sample at a symbol transition point except the dip with an average of intensities of the previous and next samples of the symbol transition point.

5. A timing extracting method in an optical transmitting/receiving system comprising:

forming a dip in an optical signal phase-modulated with a frequency f by dropping the optical intensity at a symbol transition point to approximate zero per n-symbol interval, n representing natural number more than one;

analog-to-digital (AD) converting an electrical signal obtained by detecting the optical signal in which the dip is formed;

extracting a clock component of a frequency f/n from the AD-converted sample;

deriving from a phase of the clock component a timing error signal which represents a deviation from optimum sampling timing; and adjusting a sampling timing on the basis of the timing error signal.

6. The timing extracting method in an optical transmitting/receiving system according to claim 5, wherein, the deriving a timing error signal includes a process for detecting a phase of the clock component.

7. The timing extracting method in an optical transmitting/receiving system according to claim 5, wherein the deriving a timing error signal includes a process for deciding on a symbol transition in which the optical intensity at a symbol transition point is approximately equal to zero by the phase modulation, and substituting the intensity of a sample at the symbol transition point with an average of intensities of the previous and next samples of the symbol transition point.

8. The timing extracting method in an optical transmitting/receiving system according to claim 5, wherein the deriving a timing error signal includes a process for deciding on a sample corresponding to the dip, and substituting the intensity of a sample at a symbol transition point except the dip with an average of intensities of the previous and next samples of the symbol transition point.

* * * * *